United States Patent [19]

Yoshisato

[11] Patent Number: 4,568,980
[45] Date of Patent: Feb. 4, 1986

[54] VIDEO CLAMPING CORRECTION CIRCUIT
[75] Inventor: Akiyuki Yoshisato, Soma, Japan
[73] Assignee: Alps Electric Co., Ltd., Japan
[21] Appl. No.: 500,614
[22] Filed: Jun. 3, 1983
[30] Foreign Application Priority Data Jun. 4, 1982 [JP] Japan .................. 57-95951

[51] Int. Cl.[4] ............................................. H04N 5/40
[52] U.S. Cl. .................................... 358/173; 358/172
[58] Field of Search ............ 358/160, 171, 172, 173; 307/540, 542, 555, 559

[56] References Cited

U.S. PATENT DOCUMENTS 3,832,486  8/1974  Wanek ...................... 358/186
3,978,284  8/1976  Yoshino ..................... 358/172

Primary Examiner—Tommy P. Chin
Attorney, Agent, or Firm—Guy W. Shoup

[57] ABSTRACT

A video clamping correction circuit for connection with a video clamping circuit for removing an energy dispersal signal in a receiver in an energy dispersal satellite communication system, comprises: a clamping circuit including a clamping capacitor and a clamping diode for producing a video output signal; and a correction circuit including a detecting resistor for detecting a clamping current flowing through the clamping diode, a first amplifier for inverting and amplifying a signal developed across the detecting resistor in proportion with the clamping current, an integrating circuit connected to an output of the first amplifier for integrating an output signal from the first amplifier, an integration correcting circuit connected to the integrating circuit for processing an integrated waveform of the output signal into approximation with a distorted waveform in the video output signal from the clamping circuit, and a circuit for adding an output signal from the integrating circuit and integration correcting circuit to the video output signal from the clamping circuit for cancelling out the distorted waveform in the video output.

4 Claims, 4 Drawing Figures

VIDEO CLAMPING CORRECTION CIRCUIT

BACKGROUND OF THE INVENTION

The present invention relates to a video clamping circuit, and more particularly to a video clamping correction circuit for correcting distortion waves created in a video clamp circuit in a receiver for a satellite communication system signal composed of a video signal and an energy dispersal signal in the form of a triangle wave of 30 Hz, for example, which is superimposed on the video signal.

There have heretofore been employed peak clamping circuits such as diode clamping circuits for removing an energy dispersal signal superimposed on a video signal. Where the capacitance of a clamping capacitor is reduced in order to increase the rate of removal of the energy dispersal signal, the low-frequency characteristics become poorer, causing a clamped video signal output to suffer a waveform distortion.

Therefore, the rate of removal of the energy dispersal signal is incompatible with the waveform distortion of the video signal, and they have been compromised on a certain balanced basis. As an example, in case the waveform distortion is selected to be within 5%, the rate of removal of the energy dispersal signal is experimentally known as about 26 dB. Where an improved video clamping circuit as disclosed in U.S. patent application Ser. No. 484,193 filed Apr. 12, 1983 is employed, the removal rate of about 49.5 dB has experimentally been achieved with respect to the same waveform distortion of 5% or less. Although the removal rate has considerably been improved, the waveform distortion still remains unimproved, that is, within 5%.

SUMMARY OF THE INVENTION

It is an object of the present invention to reduce waveform distortion, particularly a distortion of the waveform of a vertical synchronizing signal in a video clamping circuit.

According to the present invention, a video clamping correction circuit for connection with a video clamping circuit for removing an energy dispersal signal in a receiver in an energy dispersal satellite communication system, comprises: a clamping circuit including a clamping capacitor and a clamping diode for producing a video output signal; and a correction circuit including a detecting resistor for detecting a clamping current flowing through the clamping diode, a first amplifier for inverting and amplifying a signal developed across the detecting resistor in proportion with the clamping current, an integrating circuit connected to an output of the first amplifier for integrating an output signal from the first amplifier, an integration correcting circuit connected to the integrating circuit for processing an integrated waveform of the output signal into approximation with a distorted waveform in the video output signal from the clamping circuit, and a circuit for adding an output signal from the integrating circuit and integration correcting circuit to the video output signal from the clamping circuit for cancelling out the distorted waveform in the video output.

The above and other objects, features and advantages of the present invention will become more apparent from the following description when taken in conjunction with the accompanying drawings in which preferred embodiments of the present invention are shown by way of illustrative example.

DETAILED DESCRIPTION

Figure 1:
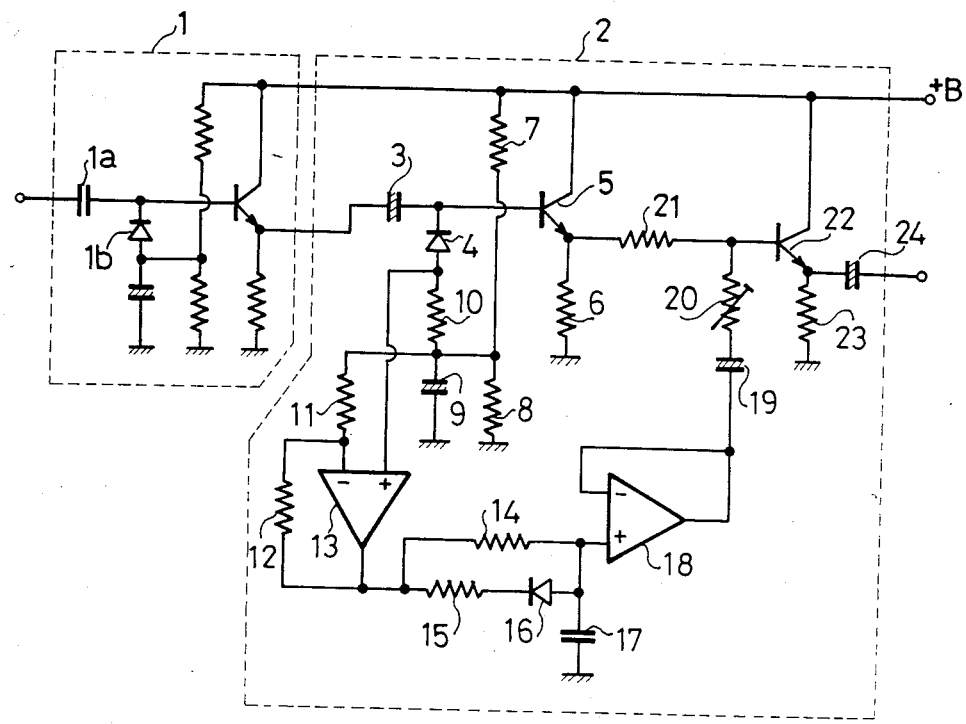
FIG. 1 is a circuit diagram of a video clamping correction circuit according to an embodiment of the present invention.

In FIG. 1, a video clamping correction circuit according to a first embodiment mainly comprises a peak clamping circuit 1 and a clamping correction circuit 2 which is added according to the present invention. The peak clamping circuit 1 includes a clamping capacitor 1a and a clamping diode 1b. The clamping correction circuit 2 is composed of a clamping capacitor 3, a clamping diode 4, a transistor 5, an emitter resistor 6, bias resistors 7, 8, a detecting resistor 10, an input resistor 11, a feedback resistor 12, an operational amplifier 13, an integrating resistor 14, a correction resistor 15, a correction diode 16, an integrating capacitor 17, an operational amplifier 18, a DC cutoff capacitor 19, a variable coupling resistor 20, a coupling resistor 21, a transistor 22, an emitter resistor 23, and a DC cutoff capacitor 24.

Figure 2:
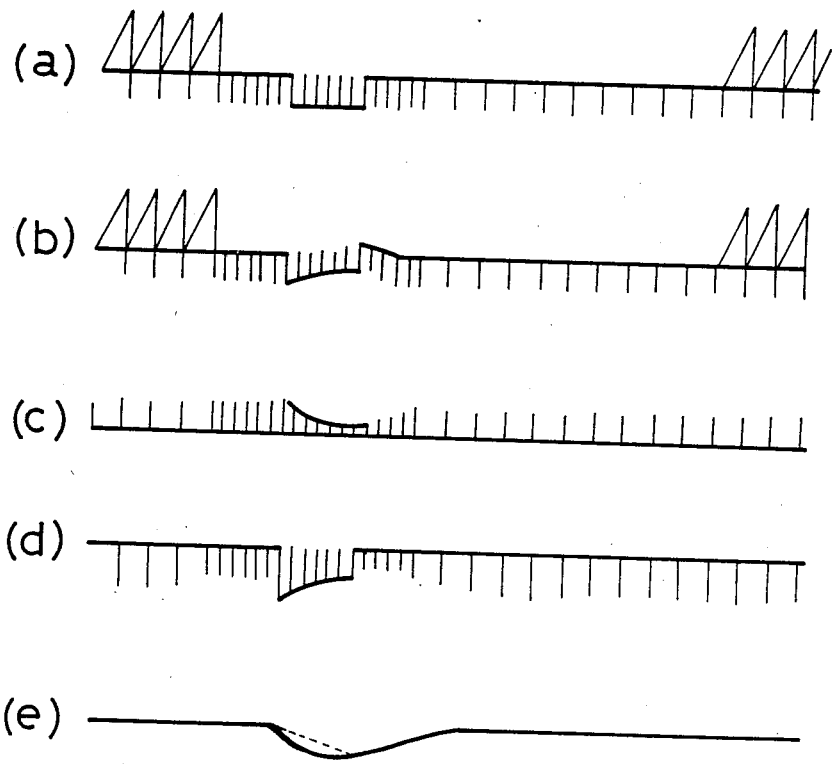
FIGS. 2 and 3 are waveform diagrams illustrative of operation of the circuit of FIG. 1.

FIG. 2 shows waveforms of signals in the circuit of FIG. 1 while the circuit is in operation.

Figure 3:
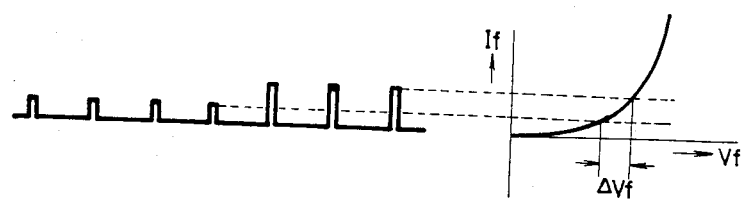

The function of the circuit shown in FIG. 1 will first be described with reference to FIG. 2. The capacitance of the clamping capacitor 1a in the peak clamping circuit 1 is normally selected to be small in order to provide a time constant substantially equal to the period of a horizontal synchronizing signal so that an energy dispersal signal in synchronism with a vertical synchronizing signal can be removed with better characteristics. With the small capacitance of the clamping capacitor 1a, lower frequencies of a video signal are transmitted insufficiently, forming a waveform distortion known as a "sag". FIG. 2(a) shows an input signal applied to the peak clamping circuit 1, the input signal being shown as excluding an energy dispersal signal for ease of illustration. FIG. 2(b) is illustrative of an output signal having a sag in the vertical synchronizing signal. As shown in FIG. 2(c), horizontal and vertical synchronizing signal zones have different clamping currents flowing through the clamping diode 1b. The different clamping currents appear as a difference in a forward-biasing voltage vf, as shown in FIG. 3, due to the non-linearity or square-law characteristics of the clamping diode 1b. As a result, the clamping level fluctuates to develope a waveform distortion with stepped peak levels in the vertical synchronizing signal zone.

The clamping correction circuit 2 serves to rectify the distortion of the vertical synchronizing signal waveform which is caused by the peak clamping circuit 1. The clamping correction circuit 2 operates on the principle that the capacitance of the clamping capacitor 3 is increased to improve the characteristics with which lower frequencies of the vertical synchronizing signal pass through the clamping capacitor 3, and the current flowing through the clamping diode 4 is detected, amplified, integrated, and then added to the clamped output signal, to thereby compensate for a variation in the forward-biasing voltage vf due to the non-linearity of the clamping diode.

The present invention is principally based on the same principle as that of the prior invention referred to above. With the prior invention, a voltage in proportion with the clamping diode current is amplified and the peak-detected signal is added to the clamped output signal with a view to improving the rate of removal of the energy dispersal signal, as will be described later on with reference to FIG. 3. According to the present invention, however, the input video signal is passed through the peak clamping circuit 1 and then through the clamping circuit in the clamping correction circuit 2, and the signal proportional to the clamping diode current is inverted, integrated and added to the clamped output, thus improving the distortion of the vertical synchronizing waveform.

The construction and operation of the clamping correction circuit 2 will now be described in greater detail. The clamping capacitor 3 comprises a large-capacity capacitor such for example as an electrolytic capacitor which develops substantially no waveform distortion. The junction between the clamping capacitor 3 and the clamping diode 4 is connected to an emitter follower composed of the transistor 5 so that the junction is of a high impedance. The bias resistors 7, 8 serve to set up a bias voltage for the clamping diode 4. The bypass capacitor 9 become low in impedance at operating frequencies to stabilize the bias voltage. The detecting resistor 10 is connected in series with the clamping diode 4 for generating a voltage proportional to the clamping diode current. The resistor 10 and the diode 4 are connected at a junction coupled to a positive input terminal of the operational amplifier 13. The operational amplifier 13 is supplied with an input signal which is an inversion of the voltage signal generated across the detecting resistor 10.

The operational amplifier 13, the input resistor 11 and the feedback resistor 12 determine the gain of the operational amplifier. The operational amplifier 13 is a non-inverting amplifier for producing an output by amplifying at a gain determined by the resistors 11, 12 an input signal which is an inversion of the voltage proportional to the clamping diode current. Alternatively, the operational amplifier 13 may be an inverting amplifier with the voltage signal across the detecting resistor 10 being supplied non-inverted to the input. FIG. 2(d) is indicative of an output signal from the operational amplifier 13.

The output signal from the operational amplifier 13 is integrated as indicated by the dotted line in FIG. 2(e) mainly by the integrating resistor 14 and the integrating capacitor 17. The integrated signal is then shaped by the correction resistor 15 and diode 16 into the waveform shown by the solid line in FIG. 2(e) which approximates the distorted input waveform illustrated in FIG. 2(b).

The operational amplifier 18 constitutes a voltage follower providing a high input impedance and a low output impedance. An output signal from the operational amplifier 18 goes through the DC cutoff capacitor 19 and the variable coupling resistor 20 to an emitter follower composed of the transistor 22. The output signal is then added to the output signal coming from the transistor 5 via the coupling resistor 21, and the added signal is delivered as an output through the emitter resistor 23 and the DC cutoff capacitor 24.

Briefly summarized, a signal approximating a distorted waveform in the vertical synchronizing signal as shown in FIG. 2(b) is generated in opposite phase, and, while adjusting the variable coupling resistor 20, is added at the input of the transistor 22 to the output signal from the transistor 5 so as to cancel out the distorted waveform of the output signal from the transistor 5, so that the original video signal as illustrated in FIG. 2(a) can be restored. Experiments indicated that the distortion which has conventionally amounted up to 5% can be reduced to 1% or less.

Figure 4:
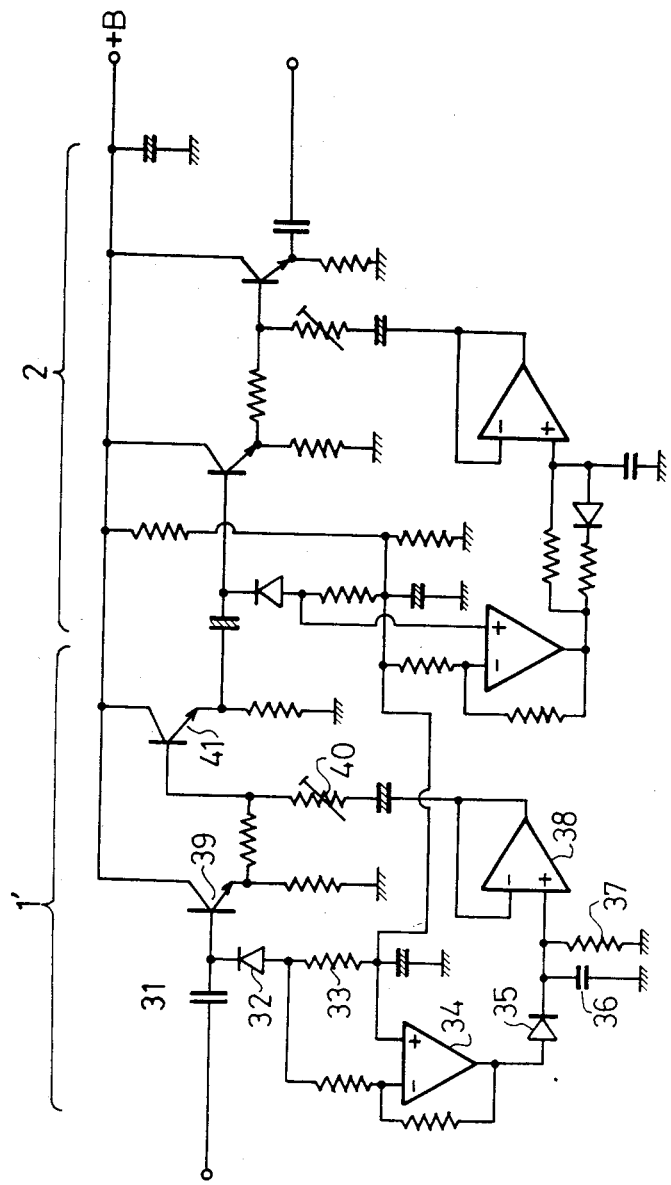
FIG. 4 is a circuit diagram of a video clamping correction circuit according to another embodiment of the present invention.

FIG. 4 shows a circuit according to another embodiment of the present invention. According to the circuit of FIG. 4, the peak clamping circuit 1 of FIG. 1 is replaced with a clamping circuit 1' which is the same as that disclosed in the prior invention. Since the clamping circuit 1' has a high rate of removal of an energy dispersal signal as described above, the overall circuit arrangement of FIG. 4 can improve the rate of removal of the energy dispersal signal and the waveform distortion.

The clamping circuit 1' will briefly be described. The clamping circuit 1' has a clamping capacitor 31, a clamping diode 32, a resistor 33 for detecting a clamping diode current, an operational amplifier 34, a diode 35, a smoothing capacitor 36, a resistor 37, an operational amplifier 38, transistors 39, 41, and a variable resistor 40.

The capacitive value of the clamping capacitor 31 is selected to be relatively large so as not to impair the low-frequency characteristics of the video signal. When a video signal with a triangle energy dispersal signal of 30 Hz superimposed is applied as an input, the current flowing through the clamping diode 32 changes at positive- and negative-going edges of the triangle wave. Like the peak clamping circuit 1 of FIG. 1, the clamp level changes stepwise in conformity with the triangle wave to thereby develop a waveform distortion due to the non-linearity of the diode in its forward-biasing direction.

To cope with this problem, a voltage developed across the detecting resistor 33 in proportion with the clamping diode current is picked up in opposite phase and inverted and amplified by the operational amplifier 34, and then the inverted voltage is processed to have a certain DC level by a peak-value detector circuit composed of the diode 35, the capacitor 36 and the resistor 37. The processed signal is then delivered through the operational amplifier 38 and the variable resistor 40 and added at the input of the transistor 41 to the signal containing the waveform distortion which is fed from the transistor 39.

Although certain preferred embodiments have been shown and described, it should be understood that many changes and modifications may be made therein without departing from the scope of the appended claims. For example, the integrating circuit and the integration correcting circuit can be constructed of active components.

What is claimed is:

1. A video clamping correction circuit for removing a distorted waveform from a video output signal of a video clamping circuit comprising:
a clamping circuit including a clamping capacitor and a clamping diode;
a detecting resistor connected to said clamping diode for detecting a clamping current flowing through said clamping diode;

a first amplifier for inverting and amplifying a signal developed across said detecting resistor in proportion with said clamping current;

an integrating circuit connected to an output of said first amplifier for integrating an output signal from said first amplifier, an integration correcting circuit connected to said integrating circuit for processing the integrated output signal into approximation with the distorted waveform in the video output signal from said video clamping circuit; and a circuit for adding an output signal from said integrating circuit and integration correction circuit to the video output signal from said video clamping circuit for providing a corrected video output signal cancelling out the distorted waveform in the video output signal.

2. A video clamping correction circuit according to claim 1, wherein said detecting resistor is connected to said video clamping circuit through said clamping capacitor and clamping diode, said first amplifier comprising an operational amplifier having input terminals connected across said detecting resistor.

3. A video clamping correction circuit according to claim 1, wherein said integrating circuit comprises an integrating resistor connected to said first amplifier and an integrating capacitor connected to said integrating resistor at a junction coupled to said adding circuit, said integration correcting circuit including a correction resistor connected to said first amplifier and a correction diode connected in series between said correction resistor and said junction.

4. A video clamping correction circuit according to claim 1, wherein said adding circuit comprises a second operational amplifier connected to said integrating circuit and integration correcting circuit, and a DC cutoff capacitor and a variable resistor connected in series between said second operational amplifier and a junction coupled to said video output signal.

* * * * *